United States Patent [19]

Stoever

[11] 4,167,115

[45] Sep. 11, 1979

[54] OSCILLATING-BALL FLOWMETER

[75] Inventor: Juergen Stoever, Warminster, Pa.

[73] Assignee: Fischer & Porter Company, Warminster, Pa.

[21] Appl. No.: 920,163

[22] Filed: Jun. 29, 1978

[51] Int. Cl.² .............................................. G01F 1/28
[52] U.S. Cl. .................................................. 73/194 E
[58] Field of Search ................................... 73/194 E

[56] References Cited

U.S. PATENT DOCUMENTS 3,739,636 6/1973 Versaci et al. ..................... 73/194 E
4,051,723 10/1977 Head et al. ......................... 73/194 E Primary Examiner—Charles A. Ruehl
Attorney, Agent, or Firm—Michael Ebert

[57] ABSTRACT

An oscillating-ball flowmeter for accurately measuring and transmitting extremely low flow rates. The meter includes a vertically-positioned flow tube having a ferromagnetic ball therein which is subjected to the force of gravity as well as the drag force imposed thereon by the upward flow of fluid being metered. An electro-optical sensor associated with the tube produces a control signal when the ball is intercepted by a light beam. This signal activates a magnet driver which energizes an electromagnet positioned above the sensing beam to generate a magnetic force that lifts the ball upwardly away from the light beam. The driver is thereafter deactivated to cause the lifted ball to fall and again intercept the light beam to re-activate the driver to repeat the cycle. As a consequence, the ball is caused to oscillate in the tube in an oscillation zone and the magnet current is pulsed at a frequency which is an inverse function of flow rate and is indicative thereof, the resultant signal being converted into a current signal directly proportional to flow rate.

9 Claims, 6 Drawing Figures

OSCILLATING-BALL FLOWMETER

BACKGROUND OF INVENTION

This invention relates generally to flowmeters of the oscillating ball type for measuring low flow rates, and more particularly to a meter of this type which is highly accurate and has long-term stability, the meter being substantially immune to changes in temperature, noise and other extraneous factors.

In recent years the need has arisen for flowmeters and flow controllers for pilot plants and plants manufacturing such materials as pharmaceuticals and rare chemicals where extremely low flow rates are encountered. Conventional flow-meters of the head meter or variable-area type are incapable of providing accurate measurement with signal transmission at extremely low flow rates.

One approach heretofore taken toward accurately measuring extremely low flow rates is that disclosed in the Spencer U.S. Pat. No. 3,662,598. In the Spencer oscillating-ball flowmeter, a ferromagnetic ball disposed within a flow tube is shifted therein in the direction of fluid flow and is repeatedly returned to its original position by actuating a magnetic return system when the ball intercepts a light beam. The transit time of the ball or its oscillatory frequency is related to flow rate and thereby serves as an indication thereof.

In a Spencer-type meter, the flow tube is maintained in a horizontal position; hence there is no gravitational component included in the vectors which determine the ball position, for only magnetic and fluid drag forces act on the ball. Thus in the absence of flow or when there is an extremely low flow rate, the ball rests on the lower surface of the glass or plastic flow tube and some degree of friction is encountered, which resistance affects the accuracy of the instrument. Any accidental small departure from a truly horizontal position may introduce unwanted gravitational forces of sizeable and random magnitude and direction with respect to the flow direction, thereby causing large zero shifts. Moreover, since a meter of the Spencer type employs a magnet whose force is always horizontal and is opposed to the flow direction, this meter is incapable of sensing less than a minimum flow imposed by friction or by small residual magnetism.

In the improved oscillating-ball flowmeter disclosed in the Head et al. U.S. Pat. No. 4,051,723, whose entire disclosure is incorporated herein by reference, the fluid to be metered is conducted upwardly through a vertical flow tube so that the ferromagnetic ball therein is subjected to the force of gravity, and in the absence of any other force tends to fall down the tube.

An electro-optical position sensor operatively associated with the tube produces a control signal when the ball intercepts a light beam. An electromagnet, when energized, produces a magnetic force attracting the ball and seeking to raise it above the light beam. A current controller is coupled to the electromagnet and is activated by the control signal to generate a magnet current for energizing the electromagnet. Because the control signal is interrupted each time the ball is lifted, this causes the magnet current to pulse and the ball to oscillate at a rate depending on the flow rate of the fluid. The frequency of this magnet current is indicated to provide a reading of flow rate.

One drawback to an oscillating-ball flowmeter of the Head et al. type is that the frequency of the output signal is inversely proportional to flow rate. This creates a problem in transmitting the flow rate reading to a process control system or a remote station, for such systems require a current whose intensity within a given range is proportional to the variable being sensed.

Another problem encountered in an oscillating-ball flowmeter of the Head et al. type is in connection with the start-up of the meter. When the power to the meter is turned off, the ferromagnetic ball returns to its rest position. At start up, when the power is first turned on, in order to lift the ball from its rest position to its regular oscillating zone in the flow tube, much more magnetic energy is required for this purpose than is called for in order to sustain ball oscillation. In some instances, the "start" trigger pulse provided in the Head et al. patent may be inadequate for start-up purposes, and the ball will remain at the rest position despite the magnetic force exerted on the ball.

Because the electro-optical position sensor which provides a control signal makes use of a light beam detected by a photosensor, noise stemming from remote light sources may disturb the operation of the sensor. Thus where these light sources are incandescent or fluorescent lamps subject to flicker at a rate determined by the power line frequency (i.e., 50 or 60 Hz), this may adversely influence the sensor. Also, because the light beam is continuously produced, the life of the electro-optical sensor may be relatively short.

Another serious problem arising with Head et al. oscillating ball flowmeters is the effect of temperature on the accuracy and reliability of the meter. Temperature changes in the magnet coil cause zero shift and also give rise to related span shifts. These temperature changes are caused by the self-heating effect of the coil current as well as environmental conditions. Moreover, the temperature of the fluid being metered may also affect the coil temperature.

SUMMARY OF THE INVENTION

In view of the foregoing, the main object of this invention is to provide a highly-accurate, oscillating-ball flowmeter for measuring extremely low flow rates, the meter yielding an output current whose intensity is proportional to flow and therefore may be transmitted without difficulty.

Also an object of this invention is to provide a flowmeter of the above-noted type having improved meter zero stability and having an electro-optical position detector whose operating life is prolonged.

Yet another object of this invention is to provide an oscillating-ball flowmeter which is substantially immune to changes in temperature, to noise and to other extraneous factors which otherwise degrade the accuracy of measurement.

Briefly stated, these and other objects are attained in an oscillating-ball flowmeter in accordance with the invention in which a ferromagnetic ball in a vertically-oriented tube is subjected to the downward force of gravity as well as to the drag force imposed thereon by the upward flow of fluid being metered.

An electro-optical position detector is provided which includes a strobed light source directed transversely toward the tube to intercept the ball therein, the beam reflected by the ball being picked up by a photosensor to produce a control signal which activates a magnet driver. The driver energizes an electromagnet to generate a magnetic force that lifts the ball upwardly away from the light beam. The driver is thereafter deactivated to cause the ball to fall to again intecept the light beam and reactivate the driver. As a consequence, the ball is caused to oscillate in the tube in an oscillation zone and the magnet current is pulsed at a frequency which is an inverse function of flow rate.

Before flowmeter power is turned on, the ball occupies a rest position below the oscillation zone. In order to supply sufficient magnetic energy when the power is first turned on to raise the ball into the oscillation zone, the necessary start-up energy greatly exceeds that required to sustain oscillation, the magnet driver at start-up is caused to generate a relatively prolonged pulse. This start-up pulse energizes the electromagnet for a period sufficient to elevate the ball.

But if when the ball is elevated into the oscillation zone, oscillation thereof does not occur and the ball returns to its rest position, the start-up pulse is regenerated after a predetermined interval, thereby avoiding overloading and overheating of the power supply of the electromagnet and the driver therefor.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
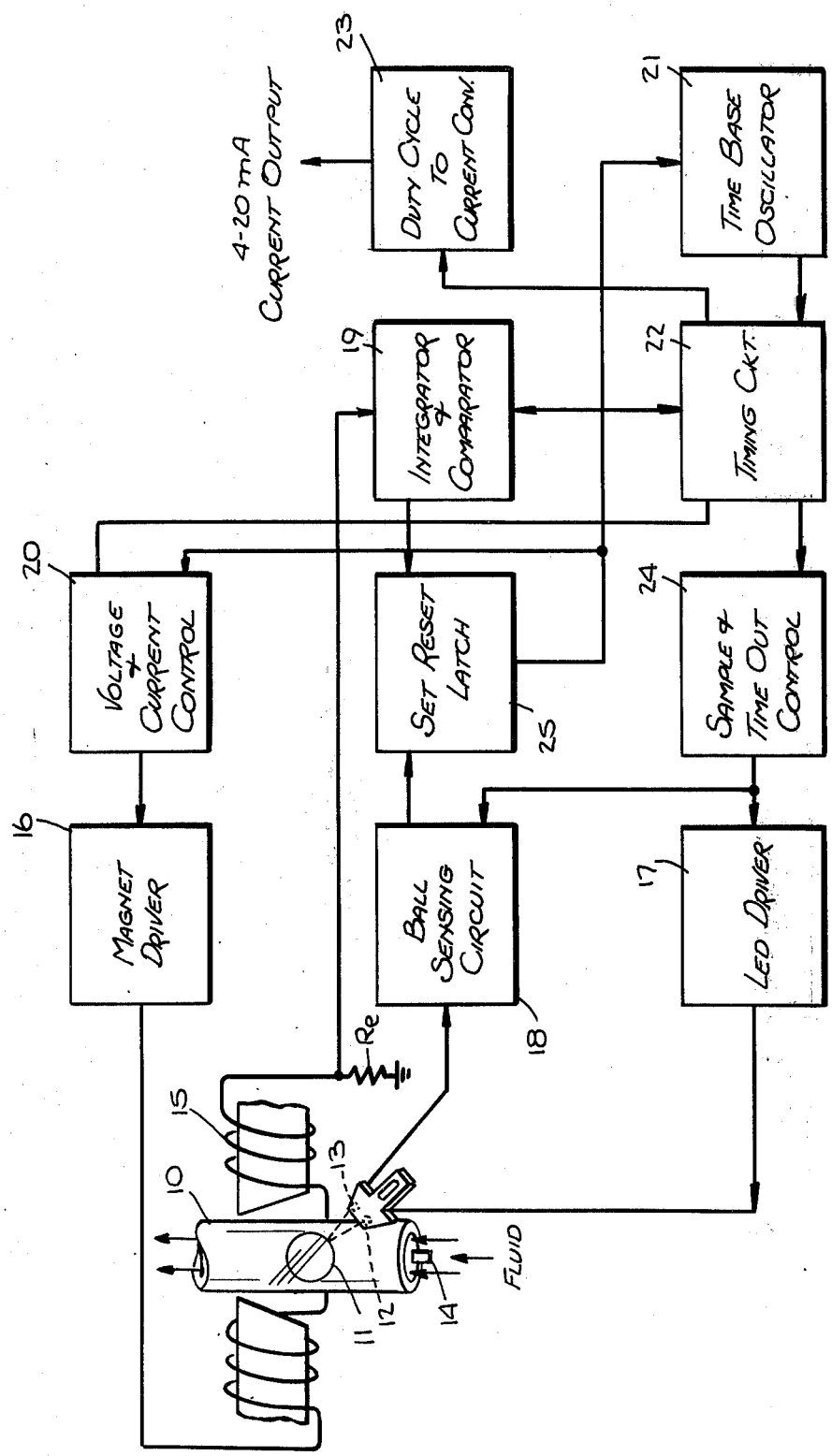
FIG. 1 illustrates an oscillating-ball flowmeter primary and its associated secondary, the electronic circuit of the secondary being shown in block diagram form.
Figure 2:
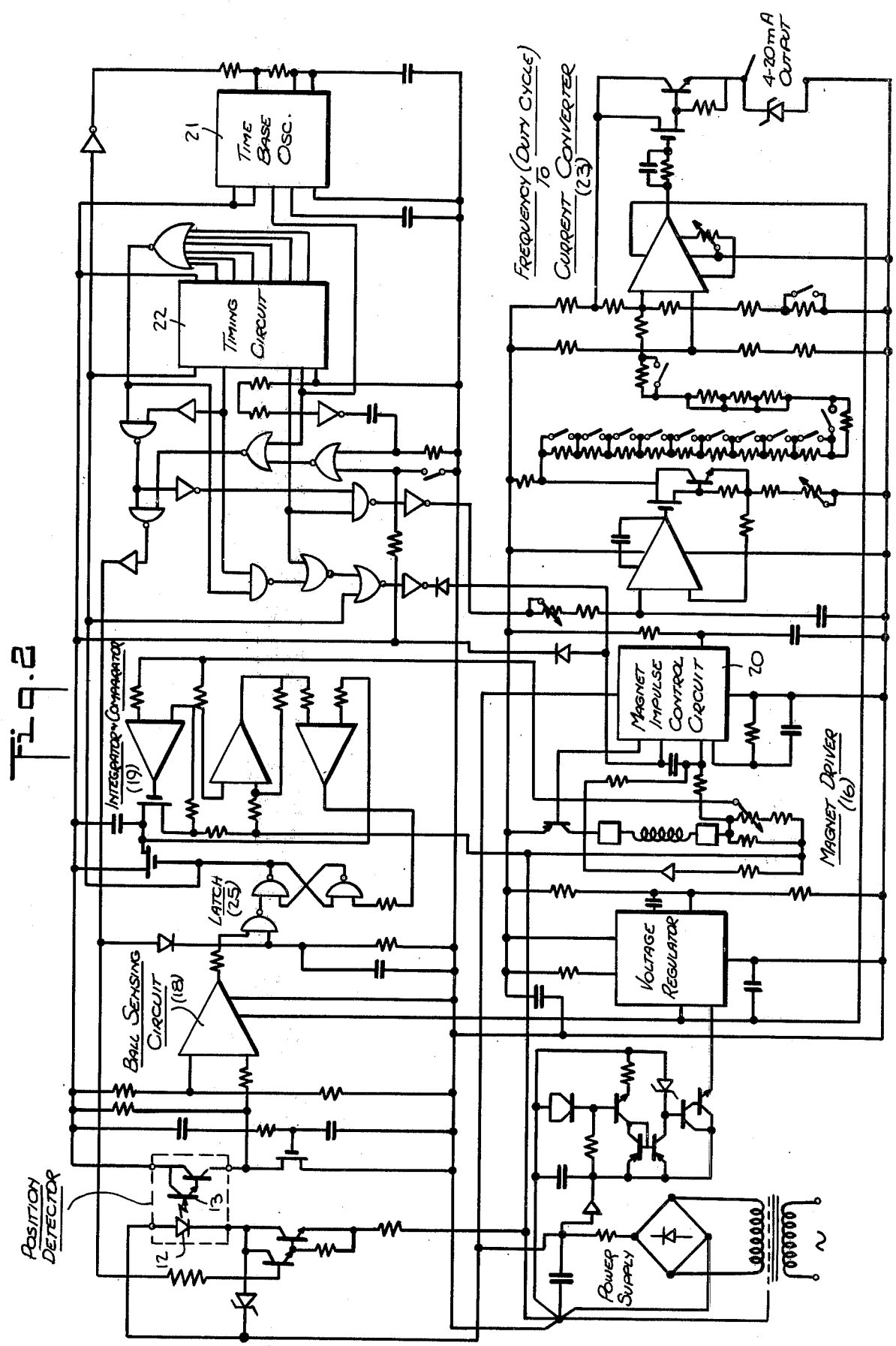
FIG. 2 is a schematic circuit diagram of the secondary.

Referring now to FIG. 1, there is shown an oscillating ball flowmeter in accordance with the invention in which the fluid to be metered is conducted through a vertically-oriented flow tube 10. Received within flow tube 10 is a ball 11 having ferromagnetic characteristics and therefore responsive to a magnetic force.

The diameter of ball 11 is smaller than that of flow tube 10, so that the ball moves freely therein. In practice, the ball may be a hollow, soft iron sphere having a protective coating thereon, or it may be formed of a light-weight plastic body having iron filings dispersed therein. Alternately, the ball may take the form of a solid plastic or glass body having an iron core embedded centrally therein, or the ball may be solid and of a heavy metal such as a magnetic stainless steel of low retentivity.

Mounted adjacent flow tube 10 is a position detector of the reflective electro-optical type constituted by a collimated light source 12 producing a light beam which is directed toward ball 11, the beam reflected by the ball being intercepted by a suitable photosensor 13. A stop 14 mounted in the flow tube below the light beam acts to prevent the ball from dropping below a rest position.

While flow tube 10 is shown as vertical, it may be at an angle with respect to vertical as long as it has an upward component. The fluid to be metered flows upwardly in flow tube 10 so that the drag force of the fluid urges the end of the ball upwardly while the force of the gravity component acting on the ferromagnetic ball urges the ball downwardly.

An electromagnet 15 adjacent flow tube 10 above the position detector is energized by a magnet driver 16. Driver 16 is triggered when ball 11 intercepts the light beam emitted by light source 12, the resultant output signal from the photosensor 13 activating the driver, thereby causing the ball in response to the magnetic force to shift upwardly away from the light beam. When this happens, the reflected beam directed toward sensor 13 is interrupted and after a period, whose duration will later be epxlained, driver 16 is de-activated to break the magnetic force acting on the ball which then falls toward the light beam. When the falling ball again intercepts and reflects the beam, the cycle is repeated. As a consequence, the ball is caused to oscillate in the tube back and forth in the oscillation zone defined between the light beam and a point thereabove.

The frequency $f_o$ of ball oscillation is dictated by a controlled impulse per pulse $I_p$ and the axial component of the buoyed ball weight $W_b$ in accordance with the following equation for zero fluid flow:

$$f_o = W_b/I_p$$

But with fluid flow, the ball is then subjected to a drag force $F_D$ which seeks to push the ball downstream. And as the flow increases, the frequency of oscillation decreases so that:

$$f = (W_b - F_D)/I_p$$

Combining equations and solving for the fluid flow drag:

$$F_D = (f_o - f)I_p$$

By designing electromagnet 15 and its associated electronic circuit so that there is a constant value of impulse imparted to the ball by each triggering of the position detector-magnet actuating arrangement, one is sure to attain a decrease in the oscillatory frequency of the ball as the fluid flow rate rises above zero that is directly proportional to the drag force imposed on the ball. Thus the frequency of the magnet driver pulses is inversely related to flow rate.

Electromagnet 15 preferably takes the form of laminated iron pole pieces disposed at diametrically-opposed positions on either side of flow tube 10. The position detector formed by light source 12 and photosensor 13 is disposed so that the light beam is directed through tube 10 at right angles to the magnetic lines of flux. In this arrangement, ball 11 never falls below the light beam to hit a lower float stop 14, except when flow is zero and the electric power supply is turned off.

The circuit, as will be later explained in detail, includes an arrangement for triggering a series of magnet pulses at a frequency that is very low compared to the lowest value of "f" to be used at highest flow rate to be measured. When power is turned on, one of these pulses raises the ball to the oscillation zone. This "start" triggering is disabled when any higher frequency is generated in normal operation.

The pulsed magnet current has the advantage of producing a "dither" ball action which minimizes possible sticking of the ball to the glass wall of the flow tube, the dither also enhancing the hydraulic characteristics by breaking up possible local air pockets and reducing ball instability that may be encountered around a stationary body.

In the electronic circuit or secondary associated with the oscillating-ball flowmeter primary whose light source 12 is preferably in the form of a light-emitting diode (LED), this LED is energized by an LED driver 17. Photosensor 13 is preferably a solid-state device which is responsive to the LED light rays reflected from ball 11 to produce a signal which is detected by a ball-sensing circuit 18. The excitation current through electromagnet 15 is sensed by a resistor $R_e$, the voltage drop thereacross producing a signal which is applied to an integrator and comparator 19 as well as to a voltage and current-control circuit 20 associated with magnet driver 16.

A stable time base oscillator 21 generates timing pulses which are applied to a timing circuit 22 that serves to govern the operation of the voltage and current-control circuit 20 for magnet driver 16. The output of timing circuit 22 is applied to a duty cycle-to-current converter 23 whose output is preferably in the standard 4 to 20 mAdc industrial process control range. The timing circuit output is also applied to a sample and time-out control 24 for LED driver 17 and ball-sensing circuit 18. Driver 17 functions as a sampled current controller for the LED of the position detector.

Ball-sensing circuit 18 applies a set pulse to an electronic latch 25 which acts to latch timing circuit 22 as well as time base 21 and integrator and comparator 19. Integrator and comparator 19 determines by way of resistor $R_e$ the energy applied to the magnet, circuit 19 applying a reset to latch 25 which in turn cuts off the magnet current. Thus de-energization is determined by the integrator and comparator, and any further impact on the sensor which could re-energize the driver is locked out for a predetermined period to prevent retriggering the circuit and magnet. The predetermined lock-out time is shorter than the shortest period of the oscillating ball.

When power to the secondary is turned off, ball 11 assumes its rest position, as determined by float stop 14, except under high overflow conditions. At this rest position, a much greater amount of magnetic energy is required at start-up to raise the ball to its oscillation zone than is needed to sustain oscillation of the ball in this zone. In order to provide the energy needed for start-off, timing circuit 22, which is controlled by time base 21, generates a relatively long start-up pulse which, through voltage and current control 20, causes magnet driver 16 to energize electromagnet 15 for a predetermined interval sufficient to elevate ball 11 to its oscillation zone.

Under normal operating conditions, this extended energization start-up period is sufficient to elevate ball 11 so that it then proceeds to oscillate in the oscillating zone as a function of flow rate. But if for some reason oscillation does not take place, the same start-up procedure after a predetermined interval is repeated. In this way, energization of the electromagnet is never on an uninterrupted basis, and overloading and overheating of the magnet coils, the power supply and the driving circuit is avoided.

In order to extend the life of light-emitting diode 12, it is operated intermittently or strobed rather than on a continuous basis. For liquid flow applications, it has been found that for this purpose a sampling rate of 1 kHz is sufficient, with a sampling time of 80 to 100 microseconds. This results in an ON-OFF ratio of 1:12.5 to 1:10, where the ON time is determined by the response time of photosensor 13.

The sampling time and duty cycle are determined by sample and time-out control 24 which operates LED driver 17, this control being governed by timing circuit 22 and time base 21. Control 24, in conjunction with timing circuit 22, also produce a time-out after the completion of a magnet impulse, thereby insuring that no secondary energization of the magnet will take place as a result of cross-talk between the magnet and sensor circuitry and cabling, or by reason of voltage drop or other factors.

In operation, when ball-sensing circuit 18 detects the presense of ball 11, the output thereof acts to set latch 25, which in turn resets timing circuit 22 and enables integrator and comparator 19. At the same time, latch 25 turns on electromagnet 15 via voltage and current control circuit 20 and magnet driver 16. With electromagnet 15 so energized, the current flowing through resistor $R_e$ in the excitation circuit develops a voltage thereacross which is applied to integrator and comparator 19.

When the integrated voltage derived from the excitation current equals a reference value, comparator 19 coupled to resistor $R_e$ acts to reset latch 25 which in turn shuts off magnet driver 16 through control 20. The latch signal also starts time base 21 and timing circuit 22 which then supplies a voltage-time-constant signal to the duty cycle-to-current converter 23.

As pointed out previously, in an oscillating-ball flowmeter, the output frequency decreases with increasing flow rate. While a frequency meter coupled to the flowmeter can be calibrated to indicate flow rate, this inverse relationship between frequency and flow rate is not acceptable in most industrial applications, particularly where the flow rate indication is to be used in an industrial process control system in which flow rate and other variables are generally translated into current signals lying within a 4 to 20 mAdc current range to operate process control equipment. Converter 23 acts to convert the output frequency of the oscillating ball flowmeter into an output current whose intensity is proportional to flow rate and hence lends itself to transmission for use in process control systems. In order to effect the necessary conversion of frequency-to-current, converter 23 acts to subtract the frequency dependent flow rate value from a constant value to produce an output signal in a 4 to 20 mAdc range that is directly proportional to flow rate.

Figure 3:
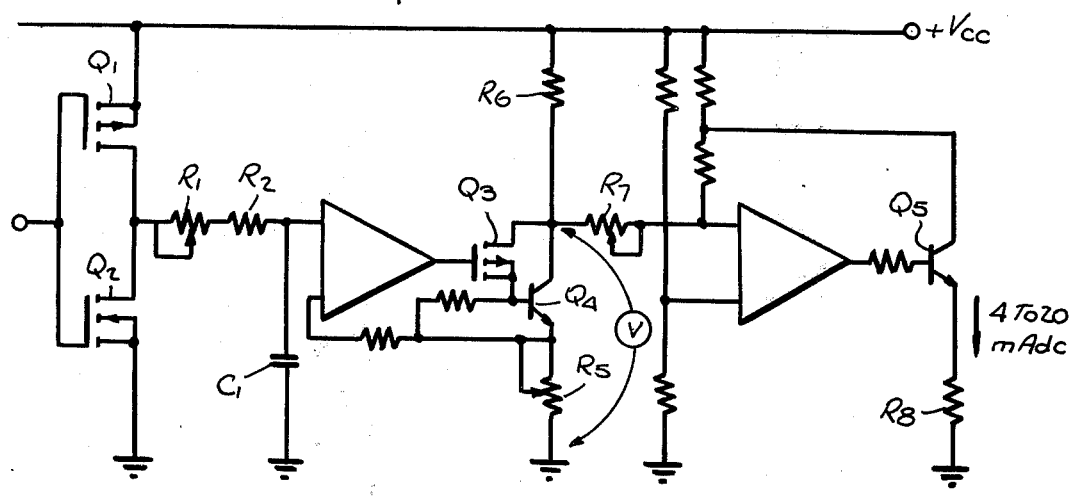
FIG. 3 is the circuit diagram of a converter to convert the output frequency of the flowmeter into an output current whose intensity is proportional to flow rate.
Figure 4A:
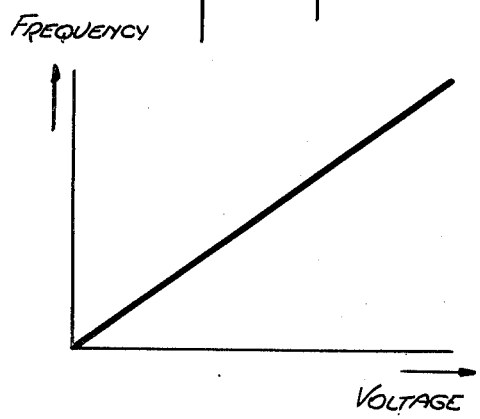
FIGS. 4A, 4B and 4C are graphs illustrative of the operation of the duty cycle-to-current converter included in the secondary.
Figure 4B:
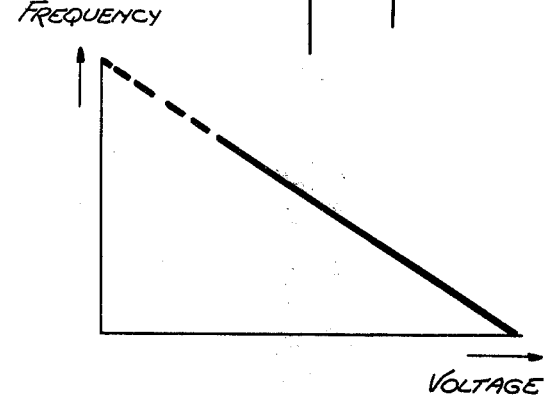
Figure 4C:
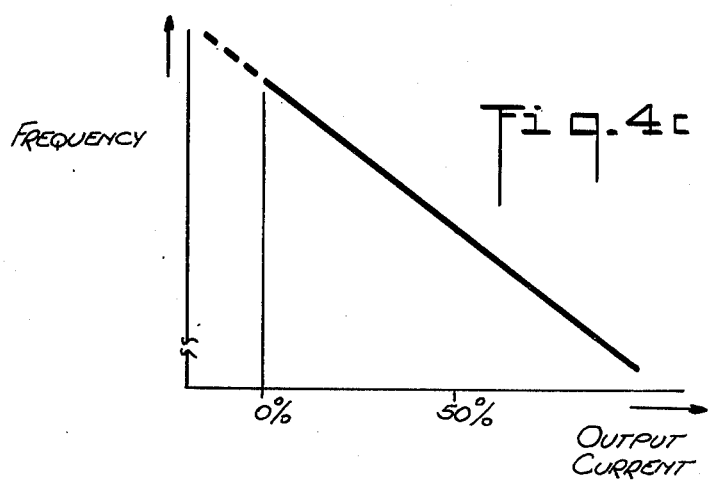

Timing circuit 22 provides all signals required for the ball-sensing circuit 18, the voltage and control circuit 20 for the magnet driver 16 under start-up conditions, and for the duty cycle-to-current converter 23. The square wave duty cycle signal is such that it can directly drive an RC averaging circuit and impedance converter in the preferred embodiment of the duty cycle-to-current converter shown in FIG. 3.

In this converter, the duty cycle frequency is applied to MOS inverter $Q_1$, $Q_2$ whose output is applied to an RC averaging circuit formed by resistors $R_1$ and $R_2$ and capacitor $C_1$. Resistor $R_2$ has an ohmic value of a few megohms, so that the source resistance ratio $Q_1/Q_2$ has only a slight influence (i.e., <0.1%) on the current flowing through resistors $R_1$ and $R_2$. The values of resistors $R_1$ and $R_2$ and capacitor $C_1$ determine the time constant of the voltage charge developed across capacitor $C_1$ and therefore, by way of MOS $Q_3$, also across resistor $R_5$ in series with transistor $Q_4$ in which the voltage is converted into a corresponding current which also flows through series resistor $R_6$.

The converted voltage V established between ground and the junction of resistor $R_6$ and transistor $Q_4$ is the difference between $+V_{cc}$, the voltage applied to the circuit, and $-(I_{R5} \times R_6)$, and therefore gives rise to an increasing output current with decreasing ball frequency. Thus, as the flow rate increases, the output current is proportionally increased.

In practice, voltage $+V_{cc}$ must be stabilized, for it acts as a reference voltage which, if subject to fluctuations, would adversely affect the meter accuracy. Resistor $R_5$ must be variable to make possible the adjustment of the 4 mA current output developed across resistor $R_8$ in series with output transistor $Q_5$. Resistor $R_7$, which determines the span, is also necessarily variable. This span can be expressed in milliamperes per flow unit. Both adjustments are independent of each other, which means that the 4 mA or live zero is unaffected by the span adjustment, and vice-versa.

In order to make it easier to adjust zero flow frequency according to the requirements, resistor $R_6$ can be subdivided in a manner whereby certain zero flow frequencies correspond to predetermined resistor values, which values can be conveniently selected by switches. In practice, the particular switch positions may be labelled with the corresponding zero flow frequencies.

After selecting an appropriate zero frequency, the primary frequency at zero flow is adjusted so as to set the current output to 4 mAdc. Instead of using a resistance divider for this purpose, one can accomplish the same result by changing the pulse width in accordance with the required zero flow frequency. The advantage of this approach over the resistance divider is that it would afford an exact ratio in pulse width which could be repeated in every produced unit, with, however, higher material costs.

Solid-state photosensor 13 has a temperature-dependent leakage current whose intensity may change within the specified temperature range of the system. Also, changes in the photosensor output current may arise as a result of changes in ambient light conditions. These current changes, unless compensated for, will produce spurious output signals and degrade the accuracy of the measurement system.

A derivative current or voltage sensing circuit is not advisable because of the sampling technique employed, and because of large changes in ball velocity and in flow velocity. Instead, ball-sensing circuit 18 which is operatively coupled to the sample and time-out control 24 uses the sampling technique to permit an automatic resistor setting in accordance with the photosensor leaking current during the OFF time of the strobed light beam and a static voltage referenced comparator for ball detection during the ON time. The resistor setting time and the ball-dtecting time are synchronized with the ON and OFF time of the LED driver 17. To reduce noise and ambient light distortion of the photosensor output, the comparator output is synchronized with the LED sampling signal, thus providing an efficient filtering action.

Meter accuracy depends on the impulse applied to the ball by the electromagnet. This impulse I equals $$I = \int_{t=t_o}^{t=t_1} F\,dt.$$

The force F is proportional to the square of the current through the excitation coil:

$$F \approx I^2,$$

or $$F = K_1 \cdot I^2$$

assuming that the magnetic conductivity $\Lambda = (A\cdot\mu)/e$ is constant. The current i follows the function:

$$i = (V_o/R)(1 - e^{-t\cdot R/L})$$

Hence the squared current is:

$$i^2 = \left(\frac{V_o}{R}\right)^2 (1 - 2e^{-t\cdot R/L})$$

For the first portion of the impulse, where the current flows from the magnet driver 16, the impulse is:

$$I = \int_{t=t_o}^{t=t_1} F\,dt = KI \cdot \int_{t=t_o}^{t=t_1} i^2\,dt$$

This may be written:

$$I = KI\left(\frac{V_o}{R}\right)^2 \cdot \left(t_1 + \frac{2L}{R}\cdot e^{-t_1\cdot R/L} - \frac{L}{2R}\cdot e^{-2t_1\cdot R/L} = \frac{1.5L}{R}\right)$$

The temperature dependent variable in this equation is the coil resistance R, whereas the inductance L is negligibly affected. A temperature change from 0° C. to 50° C. changes a copper coil resistance by approximately 20%. This would change an impulse with constant time control for the duration of the voltage by 16.3%, provided that time $t_1 = 1.5 L/R$.

With increasing time $t_1$, the error goes up to a maximum of 44%.

A time of $1.5\tau (\tau = L/R)$ was chosen for all calculations, for this was found to be a practical value related to real values.

Ideally, compensation for temperature effects on the impulse would require an integrator for the squared current which, to meet the requirement for accuracy, would be complex and expensive. A single power current integration would be much more practical. The error with such an integrator decreases with an increasing ratio of $t_1/\tau$ which is opposite to the fixed time approach. A comparison with the fixed time at $t_1 = 1.5\tau$ and $\Delta R = 20\%$ (0.9 to 1.1 R) gives an error of 6.67% with the integrator and 16.3% with fixed time.

Again, the error of the integrator approaches 0% while the other type approaches 44% with longer times. It is possible to compensate the linear error portion of the integrator, which can reduce the actual error to about 0.13% for $\Delta R = 20\%$ and $t_1 = 1.5\tau$. This would be quite sufficient. The linear error compensation is attained by adding a current dependent value to the integrated current value, though the impulse duration is determined by the current-time integral, the current and the reference. The equation for this approach is:

$$\int_{t=0}^{t=t_1} F dt \approx K2 \int_{t=0}^{t=t_1} i dt = K3 \cdot i, \text{ and therefore}$$

$$V_{REF} + K2 \cdot K4 \cdot \int_{t=0}^{t=t_1} i dt + K3 \cdot K5 \cdot i$$

With this approximation, one can implement adequate compensation for the impulse.

The decay current contributes also to the impulse. This portion is stabilized by a discharge resistor which decreases the total temperature coefficient with the ratio of the total resistance to the normal copper resistance. Furthermore, the high total resistance lowers the time constant with which the coil energy discharges, thus lowering the force to the ball. Hence the decay current becomes stabilized and also contributes little to the impulse because the larger portion of the energy is converted into heat in the resistor. A practical value for the resistor is three to five times the coil resistance. It is apparent that the present method of compensation is superior to conventional methods which employ separate temperature sensors adjacent the coil, and which are inaccurate and have poor transient response.

The following is a summary of the main features of the present invention:

A. The secondary associated with the oscillating ball primary makes it possible to translate the non-conventional relationship between an increase in flow rate and a decrease in output signal frequency to a conventional and more useful linear relationship between an increase in flow rate and an increase in output current; typically in a range extending from 4 mA at zero flow, corresponding to the highest frequency of oscillation, to 20 mA at maximum flow, corresponding to the lowest frequency of oscillation.

B. The secondary makes it possible to readily select a zero flow frequency $f_o$ that yields a linear relationship in association with the primary, the magnet pulse width then being matched with a 4 mA output at zero flow, or to adjust the pulse width to yield that value of zero flow frequency $f_o$ that yields the desired linear relationship, this frequency then being matched with a 4 mA output.

C. The secondary makes it possible to adjust the span whereby the 20 mA maximum output can be made to correspond to a range of different flow rates or different fluid characteristics.

D. The secondary makes it possible to so energize the electro-optical position detector as to prolong its effective life, as well as to increase the intensity of the reflected beam from the ball to facilitate detection thereof, and to discriminate against noise arising from extraneous light sources and from electromagnetic fields.

E. The secondary makes it possible to effect the sequential time out after the magnet pulse decays to prevent retriggering of the magnet driver, a constant time and amplitude impulse being derived from the same circuit for conversion into an output current.

F. The secondary makes it possible at start-up to produce a magnet pulse with a much higher than normal energy, typically of 16 ms duration, capable of lifting the ball from its rest or float stop position where the force field is relatively weak, to the oscillating zone, the start-up magnet pulse being repeated at a very low frequency rate, typically 0.25 Hz. Whenever the higher frequency oscillation which occurs during normal operation does not take place, this circuit automatically acts to start up the meter.

While there has been shown and described a preferred embodiment of an oscillating-ball flowmeter in accordance with the invention, it will be appreciated that many changes and modifications may be made therein without, however, departing from the essential spirit thereof.

I claim:

1. An oscillating-ball flowmeter capable of accurately measuring extremely low flow rates, said flowmeter comprising:
   A. a vertically-oriented flow tube through which the fluid to be metered flows in an upward direction;
   B. a ferromagnetic ball disposed in said flow tube and movable therein, said ball being subjected to the downward force of gravity as well as the upward drag force imposed thereon by said fluid flow;
   C. an electro-optical position detector projecting a beam of light which intercepts the ball at a detection position in said tube to produce a control signal;
   D. an electromagnet to produce, when energized, a magnetic force in said tube seeking to raise the ball above the detection position;
   E. a powered controller including a magnet driver for energizing the electromagnet, said controller being activated by the control signal to produce a magnet pulse energizing the electromagnet whereby said ball is lifted above said detection position away from said light beam and the electromagnet is thereafter de-energized, whereby the ball is caused to oscillate in the tube in an oscillation zone and the magnet current is pulsed at a corresponding frequency, an output signal being derived from said magnet pulses whose frequency varies as an inverse function of flow rate; and
   F. means to convert said output signal into an output current whose intensity is proportional to said flow rate, said converter means including means to subtract a value corresponding to said output signal and varying in accordance therewith from a constant value to produce an output value which is a direct function of flow rate.

2. A flowmeter as set forth in claim 1, wherein said detector is constituted by a light emitting diode which produces a beam that is directed toward said ball and is reflected therefrom, the reflected beam being intercepted by a photosensor.

3. A flowmeter as set forth in claim 2, wherein said light emitting diode is energized periodically at a high frequency sampling rate to prolong the life of the detector.

4. A flowmeter as set forth in claim 3, wherein said diode is energized periodically at a sampling rate of about 1 kHz with a sampling time of energization of about 80 to 100 microseconds.

5. A flowmeter as set forth in claim 1, further including a stop to maintain said ball at a rest position below said detection position when the power is turned off.

6. A flowmeter as set forth in claim 5, further including means when the power to said controller is first turned on to cause said driver at start-up to generate a relatively prolonged pulse to energize the electromagnet for a period sufficient to raise the ball from the rest position into the oscillation zone.

7. A flowmeter as set forth in claim 6, further including means to regenerate the start-up pulse after a predetermined interval when the ball is elevated into the oscillation zone and oscillation does not occur.

8. A flowmeter as set forth in claim 7, wherein said regeneration of the start-up pulses is effected at a very low frequency rate.

9. A flowmeter as set forth in claim 1, including means to render said controller insensitive to extraneous light.

* * * * *